United States Patent
Tranter et al.

(10) Patent No.: US 7,923,692 B2
(45) Date of Patent: Apr. 12, 2011

(54) RADIOISOTOPE DETECTION DEVICE AND METHODS OF RADIOISOTOPE COLLECTION

(75) Inventors: Troy J. Tranter, Idaho Falls, ID (US); Christopher P. Oertel, Idaho Falls, ID (US); John R. Giles, Pocatello, ID (US); Nicholas R. Mann, Rigby, ID (US); Michael E. McIlwain, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 184 days.

(21) Appl. No.: 12/244,876

(22) Filed: Oct. 3, 2008

(65) Prior Publication Data
US 2010/0084561 A1    Apr. 8, 2010

(51) Int. Cl.
*G01T 1/17*    (2006.01)
(52) U.S. Cl. .................................. 250/364; 250/363.01
(58) Field of Classification Search ............. 250/363.01, 250/364
See application file for complete search history.

(56) References Cited

U.S. PATENT DOCUMENTS

| | | | |
|---|---|---|---|
| 4,298,796 A | | 11/1981 | Warner et al. |
| 5,008,579 A | | 4/1991 | Conley et al. |
| 5,496,502 A | | 3/1996 | Thomson |
| 6,303,936 B1 | * | 10/2001 | DeVol et al. .................. 250/364 |
| 7,723,114 B1 | * | 5/2010 | Coates et al. .................. 436/57 |
| 2005/0205799 A1 | * | 9/2005 | Gentile et al. ................ 250/393 |
| 2006/0284094 A1 | * | 12/2006 | Inbar .......................... 250/359.1 |
| 2007/0029491 A1 | * | 2/2007 | Olden et al. ............. 250/370.08 |

OTHER PUBLICATIONS

Egorov et al., Radionuclide sensors based on chemically selective scintillating mivrospheres: renewable column sensor for analysis of 99Tc in water, 1999, Anal. Chem., 71, 5420-5429.*

Grate et al., Sensors and Automated analyzers for Radionuclides, Apr. 19, 2005, American Chemical Society, Chapter 14, pp. 322-341.*

Andryushchenko et al., "Sorption-scintillation determination of 90Sr in natural water," Analytica Chimica Acta 480 (2003) 151-156.

* cited by examiner

*Primary Examiner* — David P Porta
*Assistant Examiner* — Djura Malevic
(74) *Attorney, Agent, or Firm* — TraskBritt (57) ABSTRACT

A device for collection of radionuclides includes a mixture of a polymer, a fluorescent organic scintillator and a chemical extractant. A radionuclide detector system includes a collection device comprising a mixture of a polymer, a fluorescent agent and a selective ligand. The system includes at least one photomultiplier tube (PMT). A method of detecting radionuclides includes providing a collector device comprising a mixture comprising a polymer, a fluorescent organic scintillator and a chemical extractant. An aqueous environment is exposed to the device and radionuclides are collected from the environment. Radionuclides can be concentrated within the device.

30 Claims, 6 Drawing Sheets

RADIOISOTOPE DETECTION DEVICE AND METHODS OF RADIOISOTOPE COLLECTION

CONTRACTUAL ORIGIN OF THE INVENTION

This invention was made with government support under Contract Number DE-AC07-05ID14517 awarded by the United States Department of Energy. The government has certain rights in the invention.

TECHNICAL FIELD

Embodiments of the inventions herein relate to systems, devices, and methods for collection of radionuclides.

BACKGROUND OF THE INVENTION

Many sites globally have ground water and surface water contamination resulting from past activities associated with nuclear reactors, nuclear fuel reprocessing, or uranium enrichment. Some of the primary environmental contaminants are radionuclides with long to moderate half-lives that should be measured and monitored to determine the extent of plume migration and potential exposure to the general public. Predominant among these radionuclide contaminants are the isotopes strontium-90 ($^{90}$Sr) and technetium-99 ($^{99}$Tc). These isotopes can be difficult to measure and monitor because they decay by pure beta particle emission and do not release any measurable gamma or X-ray photons. Consequently, in situ gamma detectors that are often used for other isotopes are not applicable to $^{99}$Tc and $^{90}$Sr isotope measurements. For measurement of these isotopes, samples are typically physically collected from monitoring wells (grab samples) and transported to be analyzed in analytical laboratories, usually by lengthy and expensive separation procedures.

Recently, it is desired to reduce costs of sampling and monitoring plume activities. Numerous monitoring wells have incorporated automated down-hole water level, water temperature and electrical conductivity (salinity) sensors. In addition, many of these systems are also equipped with telemetry for remote network access to data. However, despite these automated measurement capabilities, liquid grab-samples are taken and transported to a laboratory for analysis for most chemical and radiological analysis. These monitoring and sampling activities are performed on schedules ranging from monthly to yearly. Often it can take weeks to months to receive data. The costs associated with obtaining the grab-samples and performing subsequent analysis may be excessive. Sampling events are also subject to weather conditions. Accordingly, it is desirable to develop other systems, devices, and methods for collecting, detecting, and/or monitoring radioisotopes.

SUMMARY OF THE INVENTION

A radionuclide detector system including a collection device comprises a mixture of a polymer, a fluorescent agent, and a selective chemical extractant. The detector system includes at least one photomultiplier tube (PMT).

A device, used for collection of radionuclides, includes a mixture of a polymer, a fluorescent organic scintillator, and a chemical extractant.

A method for detecting radionuclides includes collecting and concentrating radionuclides from an aqueous environment within a collector device comprising a mixture comprising a polymer, a fluorescent organic scintillator, and a chemical extractant.

BRIEF DESCRIPTION OF THE DRAWINGS

Embodiments of the invention are described below with reference to the following accompanying drawings.

DETAILED DESCRIPTION

Systems, devices, and methods of the present invention are used for collection, concentration, detection and/or monitoring of radionuclides in an aqueous environments, such as rivers, lakes and groundwater systems, where potential contamination exists from nuclear reactors, nuclear fuel reprocessing or uranium enrichment. The systems and devices have been developed to monitor isotopes such as strontium-90 ($^{90}$Sr) and technetium-99($^{99}$Tc). Since such isotopes decay by pure beta particle emission, not releasing any measurable gamma or X-ray photons, such isotopes are difficult to measure and monitor.

Water plumes can be contaminated with $^{99}$Tc and/or $^{90}$Sr. Technetium exists predominately as the highly mobile pertechnetate anion ($^{99}$TcO$_4^-$), being extremely mobile in both ground water and surface water. Due to the relatively high activities, ease of transport, and potential hazard, the $^{99}$Tc radionuclide requires constant and regular monitoring. At particular sites $^{99}$Tc has been known to have migrated offsite and be present in ground water plumes at concentrations that exceed various water standards. $^{90}$Sr activities are relatively localized but can also be found in relatively high concentrations in some locations. Accordingly, detection and monitoring of $^{90}$Sr and $^{99}$Tc, as well as other radionuclides, at locations is desirable.

The systems, devices, and methods of the invention are described below primarily with respect to use in an aqueous environment such as a monitoring well for detection, collection, concentration and/or monitoring of one or both of $^{99}$Tc and $^{90}$Sr. It is to be understood, however, that the invention contemplates additional embodiments where these systems, devices, and methodologies are adapted for alternative nuclides.

Systems, devices, and methods of the invention enable collection, concentration, detection and monitoring of radio-nuclides without performing "grab-samples" and offsite analysis.

Any device described may have a composite structure that contains a polymer, a fluorescent agent, such as a fluorescent organic scintillator, and a chemical extractant, which is referred to as a ligand. The polymer may be a macroporous polymer that is doped with an organic fluorescent agent to become a scintillating polymer. The macroporous polymer can be, for example, polyvinyltoluene, polymethylmethacrylate or polystyrene.

An organic ligand is sequestered within the macroporous polymer. Such ligand will be specific for the isotope of interest and will be chosen based upon its selectivity for the element of interest in the given environment conditions. For example, ALIQUAT® 336 may be utilized as a ligand to separate and concentrate $^{99}$Tc (in the form of $^{99}$TcO$_4^-$) in various types of aqueous environments, which may contain other man-made or naturally occurring radionuclides.

A composite structure is synthesized utilizing a mixture consisting of a solvent, a monomer, an organic scintillator, and a ligand. The monomer is then polymerized to form a plastic containing the scintillator and ligand. The polymerization method forms a macroporous solid having numerous channels and voids allowing liquid transport therethrough. The polymer may be formed into small beads, thin films, strips, and/or blocks. Alternatively, the polymer may be dissolved utilizing a solvent, the ligand added, with solidification of the polymer and ligand in a water bath.

For the present invention, suitable scintillators include anthracene and stilbene. In some instances p-terphenyl activated with diphenylbutadiene may be used. In some instances it may be preferable to add an additional compound during polymerization of the composite structure as a wavelength shifter to provide an emission spectrum to match the spectral response of a photomultiplier tube (PMT).

An organic ligand is used to capture the radioisotope while the scintillating polymer is used as a plastic scintillation detector. Such a configuration allows the radioisotope to be concentrated inside the actual detector, providing high counting efficiency while concentrating the radioisotope for a desired period when very low detection capability is desired. The kinetic energy of the particle decay (alpha or beta) causes electron excitation in the organic scintillating molecules, which then releases fluorescent energy as the electrons in the molecules return to a ground state.

Figure 1:
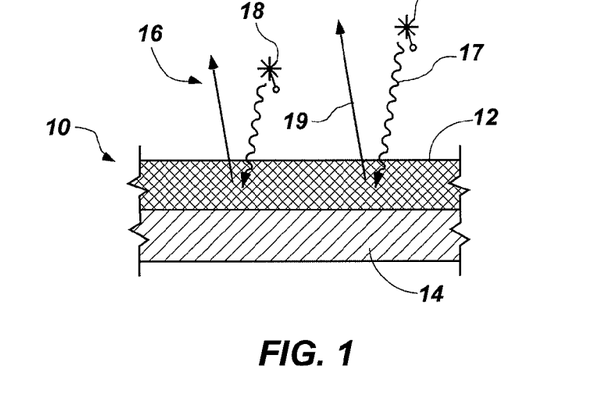
FIG. 1 is a cross section of an adhesive plastic scintillator attached to a support medium illustrating the principles of the invention.

Illustrated in FIG. 1 is a scintillating solid support medium 10 having a composite scintillator 12, as described above, attached to a support medium 14. A sample 16 includes radiolabled constituents 18, which produce radiation energy that interacts with the composite scintillator 12. The composite scintillator 12 converts the radiation energy 17 into light energy 19. Since the scintillating solid support medium 10 can vary, light energy need not be internally reflected within the support medium 14 to propagate along the support medium 14 for detection thereof. The composite scintillator 12 forms a distinctive layer between the solid support medium 14 and any sample 16.

Figure 2:
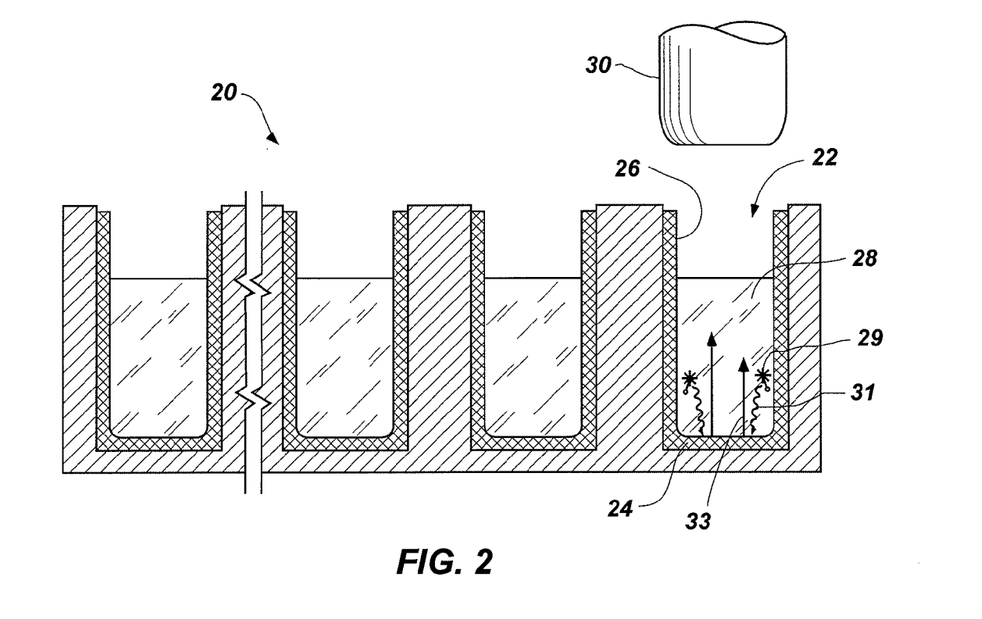
FIG. 2 is a cross section of an adhesive plastic scintillator coating attached to the wells of a plate.

Illustrated in FIG. 2 is a scintillating plate 20 having a plurality of sample wells 22, each having a composite scintillator coating 24 attached to a portion of the surfaces 26 of the sample wells 22. Samples 28 are introduced into the sample wells 22 for analysis in a liquid medium, such as water. A sample 28 includes radioactive constituents 29. The composite scintillator coating 24 converts the radiation energy 31 into light energy or scintillations 33 when the composite scintillator coating 24 is exposed to the sample 28. A PMT 30 detects and counts the scintillations caused by the sample 28. The scintillation plate 20 may be made of a variety of materials having optical characteristics, including opaqueness and colors. The composite scintillator coating 24 may adhere without penetrating the plate 20. The composite scintillator coating 24 remains fixed to the surface 26 of the plate 20 so that the plate 20 may be reused.

Figure 3:
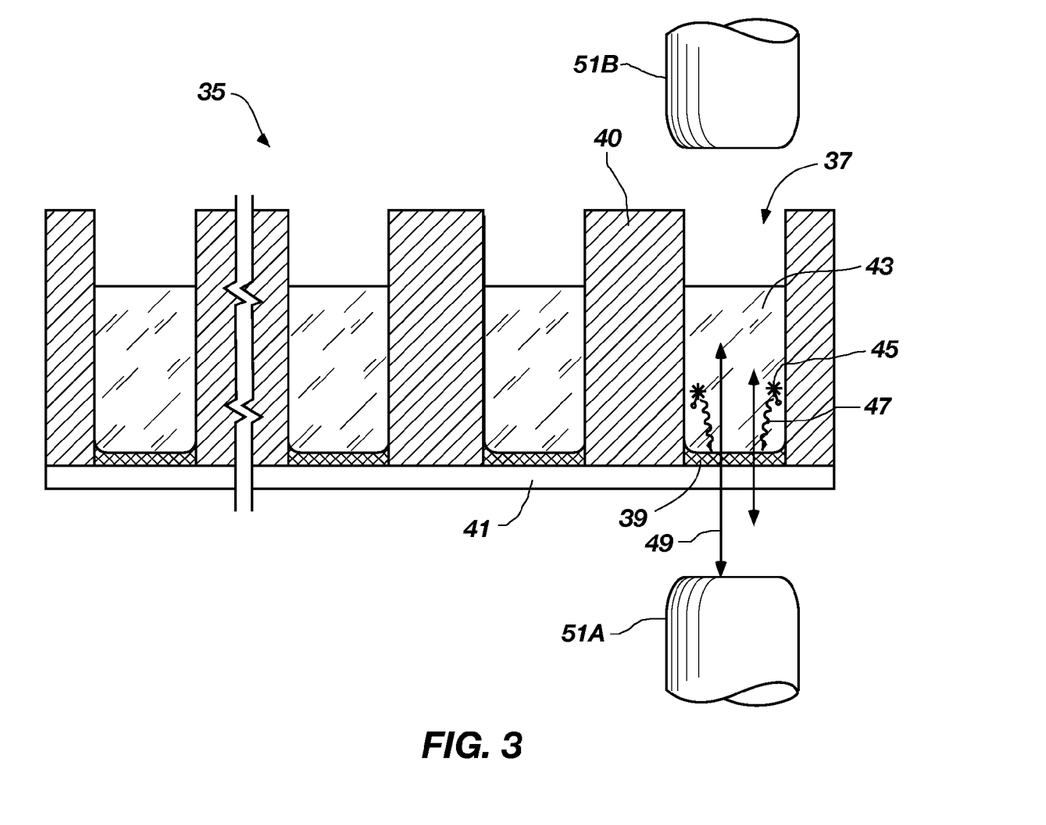
FIG. 3 is a cross section of an adhesive plastic scintillator coating attached to the wells of a plate with a sample therein.

Illustrated in FIG. 3, a plate 35 has a plurality of sample wells 37 having a composite scintillator coating 39 attached to portions of a transparent bottom 41 of the plate 35. The walls 40 of the plate 35 are opaque to prevent cross-talk between the wells 37. A typical sample 43 comprises radioactive constituents 45 so that the composite scintillator coating 39 converts radiation energy 47 into light energy 49. FIG. 3 illustrates a wet counting arrangement. PMTs 51A and 51B are positioned above and below the plate 35.

Figure 4:
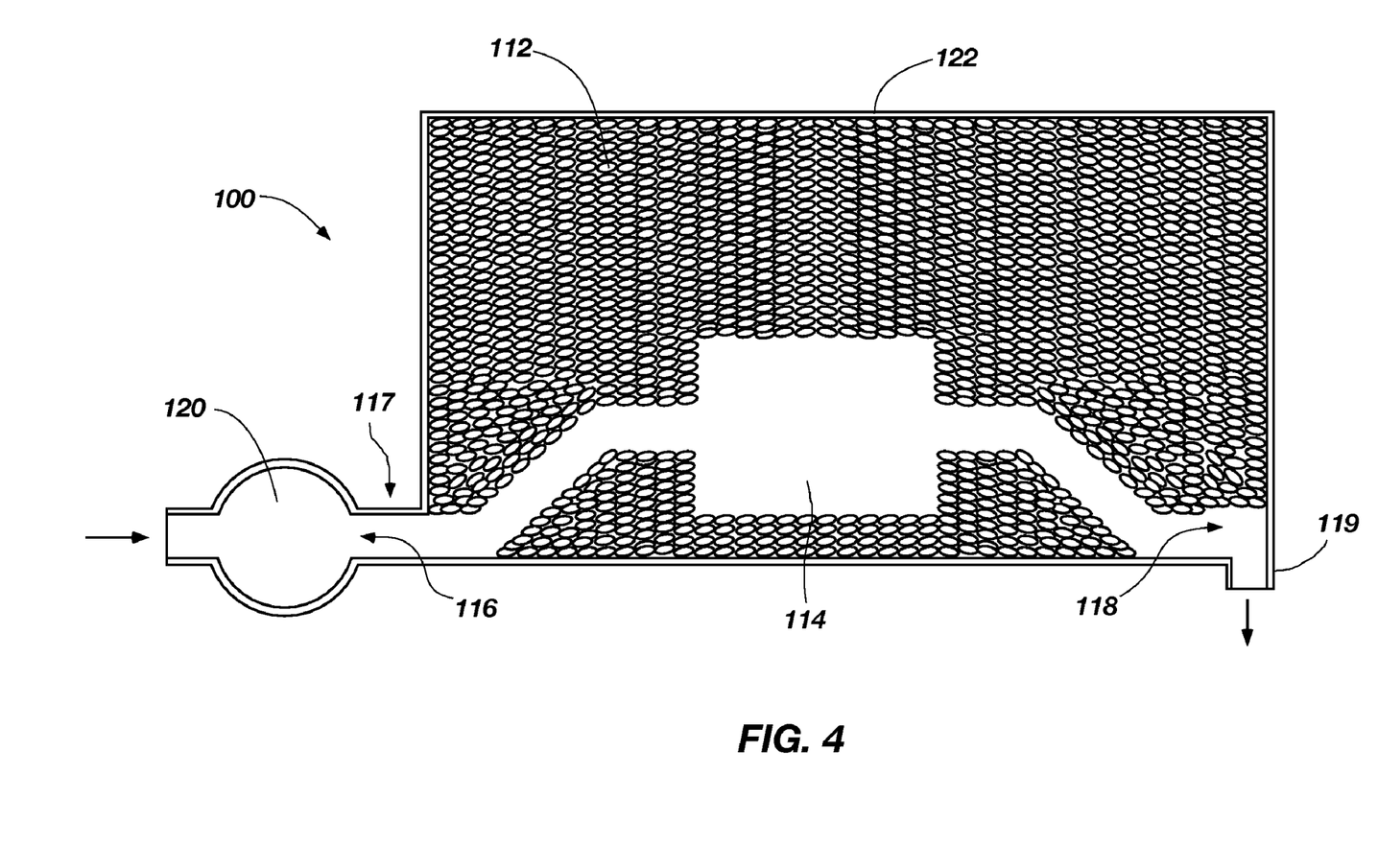
FIG. 4 is a cross-sectional representation of a device in accordance with one embodiment of the invention.

Illustrated in FIG. 4 is a device 100 comprising a composite scintillator structure 112 that includes a polymer, a fluorescent agent such as a fluorescent organic scintillator, a chemical extractant and a ligand. The polymer may be a macroporous polymer that is doped with an organic fluorescent agent to become a scintillating polymer. The macroporous polymer can be, for example, polyvinyltoluene, polymethylmethacrylate or polystyrene.

As illustrated in FIG. 4, a fluid pathway 114 of any desired shape is provided through composite 112. Passageway 114 can comprise an inlet 116 and an outlet 118. Water flows through passageway 114 by gravity or by pumping utilizing a pump 120.

Where device 100 is to be used in an aqueous environment, composite 112 may be encased in a housing 122. Housing 122 preferably comprises a thin, easily formed material. Typical materials used for housing 122 include but are not limited to aluminum and stainless steel. Any surfaces of the housing 122 that may contact the polymer may be coated and polished to provide a reflective surface.

Housing 122 includes an inlet port 117 and an outlet port 119 made of any convenient non-reflective material. While the relative location of the passageway 114, inlet 117 and outlet 119 are for convenience, it is desirable to configure the housing 122 to minimize light transmission and/or reflection. For example, it is desirable to have inlet port 117 and outlet port 119 located at right angles relative to one another on the housing 122. Ports 117 and 119 may be constructed of non-reflective, corrosion resistant material such as, for example, polyethylene (PE), high-density polyethylene (HDPE), low-density polyethylene (LDPE), etc.

The device 100 illustrated in FIG. 4 can be used to collect and concentrate radionuclides from the environment within the device. In particular instances, the radionuclides concentrated within the device 100 can be pure beta and/or alpha emitting radionuclides. In an aqueous environment, it is preferred that the polymer, scintillator, and extractant of the device 100 are contained within the housing 122.

When the device 100 is used in an aqueous environment, water can be made to flow by gravity or pumping through the housing 122. The radionuclide collection and/or concentration can comprise binding the radionuclide to the ligand sequestered within the polymer and scintillator. Particle decay (alpha or beta) then causes electron excitation in the fluorescent organic scintillating molecule. Fluorescent energy is then released and can be detected as a fluorescent signal.

Figure 5:
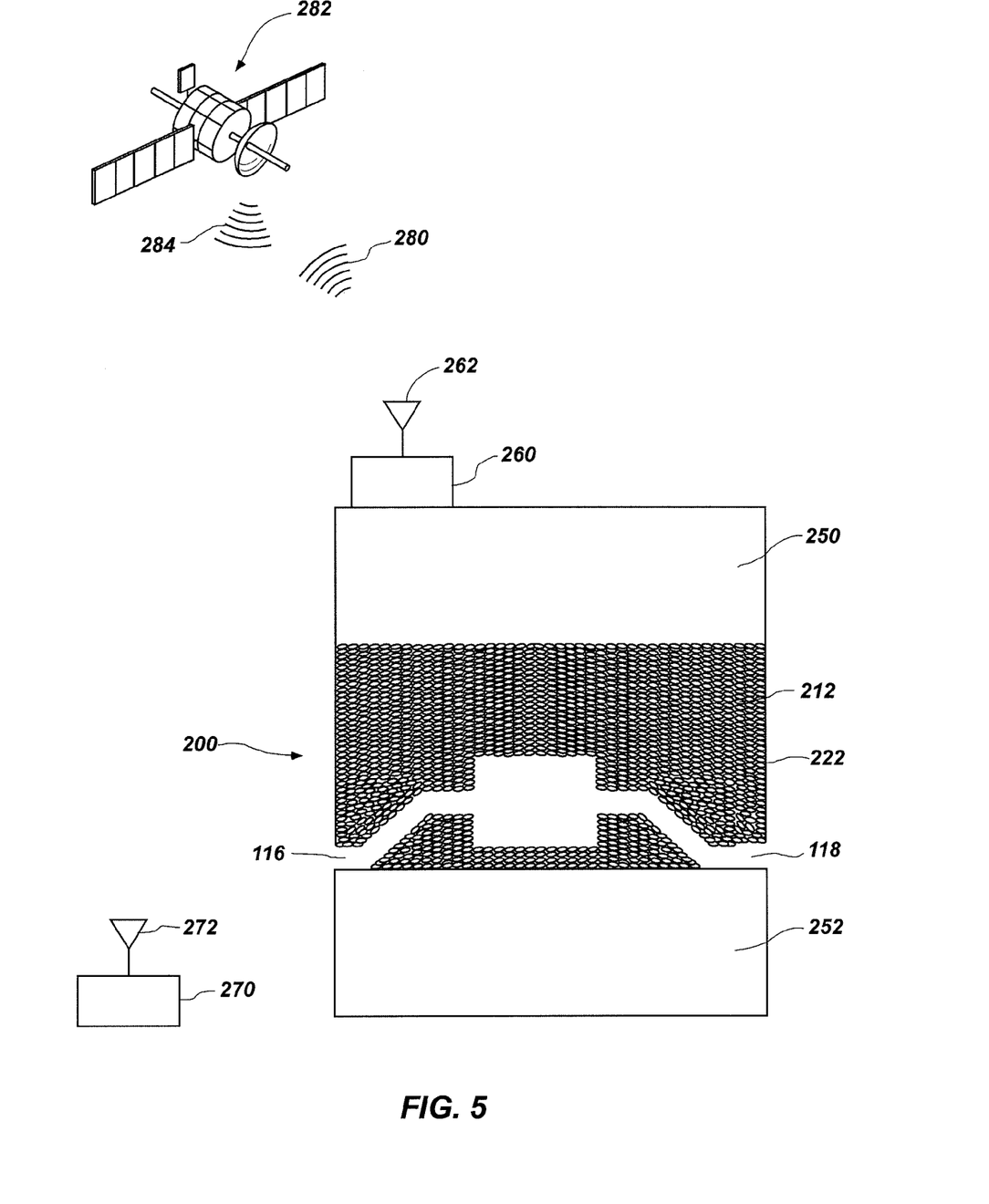
FIG. 5 is a cross-sectional and diagrammatic representation of a system in accordance with a second embodiment of the invention.

Illustrated in FIG. 5, is a system 200 comprising a device 100 (FIG. 4) as described herein. System 200 can further comprise one or more PMTs 250, 252 coupled to the plastic scintillator within composition 212. The PMTs 250, 252 convert fluorescent light energy to electrical energy. As mentioned above, composition 212 can include another compound that may be a wavelength shifter to tailor the emission spectrum to match the spectral response of the PMTs 250, 252.

In particular embodiments, system 200 can comprise two PMTs 250, 252 attached directly to a housing 222 and disposed 180° apart with respect to each other. A photodiode (not shown) may also be utilized in conjunction with each PMT 250, 252.

The system 200 additionally includes appropriate suitable conventional telemetry to provide remote monitoring and data transmission capability. System 200 includes, for example, a transmitter 260 having antenna 262. The transmitter 260 can emit data signals 280 that can be passed by a transponder, such as a satellite transponder 282, by retransmitted signal 284. A receiver 270 having receiving antenna 272 can receive the retransmitted signal and can provide data for viewing by the end user. Typically, the data signal 280 will be encrypted and receiver 270 will have decryption capabilities.

When using system 200, the output of the PMTs 250, 252 can be amplified to increase an initial fluorescent signal. A photodiode or alternative photo detector may also be utilized. The electronic signal from the PMTs 250, 252 can be transmitted to an end user at a desired location.

The systems, devices, and methods of the invention avoid the need for obtaining grab samples and the time and expense of transporting such samples to distant sites for analysis since real-time data analysis is afforded by the present system. Additionally, the devices of the invention can be adapted for a particular environment and tailored to specific radionuclides. Accordingly, devices, systems and methods of the invention can be highly advantageous relative to conventional techniques and devices.

Figure 6:
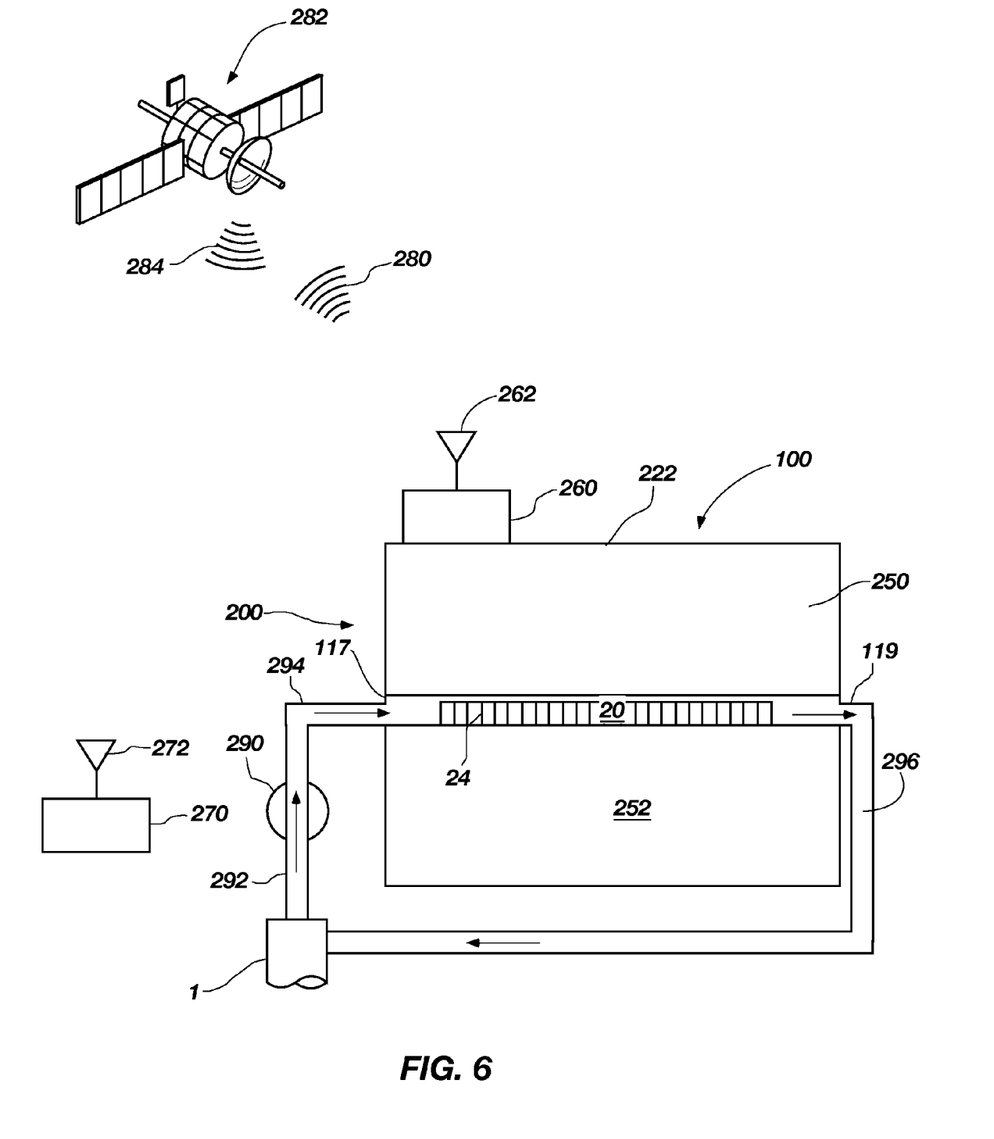
FIG. 6 is a cross-sectional and diagrammatic representation of a system in accordance with a third embodiment of the invention.

Illustrated in FIG. 6, is a system 200 connected to a well 1 by conduit 292 connecting the well 1 to a pump 290, which connects to inlet 117 of device 100 through conduit 294. The device 100 has outlet 119 connected to conduit 296, which returns water to well 1. Device 100 comprises two PMTs 250, 252 attached directly to the housing 222 and disposed 180° apart with respect to each other and scintillating plate 20 having scintillator coating 24 as described herein for the water from the well 1 to flow thereover in the wells 22 of the plate 20 (FIG. 2). The PMTs 250, 252 convert fluorescent light energy to electrical energy. As mentioned above, composition 212 can include another compound that may be a wavelength shifter to tailor the emission spectrum to match the spectral response of the PMTs 250, 252. A photodiode may also be utilized in conjunction with each PMT 250, 252.

The system 200 additionally includes appropriate suitable conventional telemetry to provide remote monitoring and data transmission capabilities. System 200 includes, for example, a transmitter 260 having an antenna 262. The antenna 262 can emit data signals 280 that can be passed by a transponder, such as a satellite transponder 282, by retransmitted signal 284. A receiver 270 having a receiving antenna 272 can receive the retransmitted signal 284 and can provide data for viewing by the end user. Typically, the data signal 280 will be encrypted and receiver 270 will have decryption capabilities.

When using system 200, the output of the PMTs 250, 252 can be amplified to increase an initial fluorescent signal. A photodiode or alternative photo detector may also be utilized. The electronic signal from the PMTs 250, 252 can be transmitted to an end user at a desired location.

Figure 7:
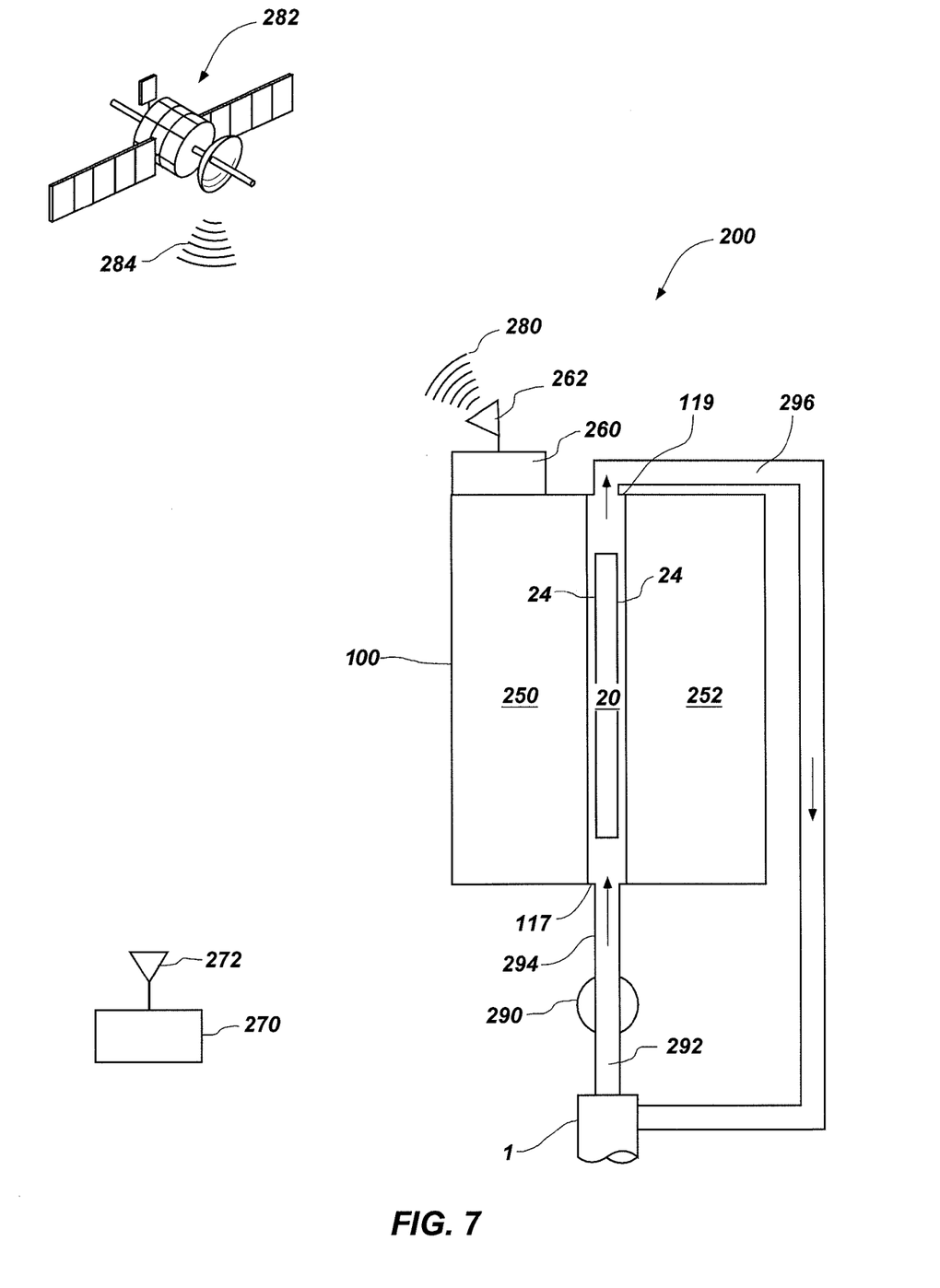
FIG. 7 is a cross-sectional and diagrammatic representation of a system in accordance with a fourth embodiment of the invention.

Illustrated in FIG. 7, is a system 200 connected to a well 1 by conduit 292 connecting the well 1 to a pump 290, which connects to inlet 117 of device 100 through conduit 294. The device 100 has outlet 119 connected to conduit 296, which returns water to well 1. Device 100 comprises two PMTs 250, 252 attached directly to a housing and disposed 180° apart with respect to each other and scintillating plate 20 having a scintillator coating 24 thereon as described herein for the water from the well 1 to flow thereover. The PMTs 250, 252 convert fluorescent light energy to electrical energy. As mentioned above, composition 212 can include another compound that may be a wavelength shifter to tailor the emission spectrum to match the spectral response of the PMTs 250, 252. A photodiode (not shown) may also be utilized in conjunction with each PMT 250, 252.

The system 200 additionally includes appropriate suitable conventional telemetry to provide remote monitoring and data transmission capability. System 200 includes, for example, a transmitter 260 having an antenna 262. Such can emit data signals 280 that can be passed by a transponder, such as a satellite transponder 282, by retransmitted signal 284. A receiver 270 having a receiving antenna 272 can receive the retransmitted signal 284 and can provide data for viewing by the end user. Typically, the data signal 280 will be encrypted and receiver 270 will have decryption capabilities.

When using system 200, the output of the PMTs 250, 252 can be amplified to increase an initial fluorescent signal. A photodiode or alternative photo detector may also be utilized. The electronic signal from the PMTs 250, 252 can be transmitted to an end user at a desired, predetermined location.

It is to be understood that the inventions herein are not limited to the specific features shown and described herein. The invention is, therefore, claimed in any of its forms or modifications within the proper scope of the appended claims appropriately interpreted in accordance with the doctrine of equivalents.

What is claimed is:

1. A radionuclide detector system, comprising:
    a collection device, comprising:
        a support structure configured to receive a sample;
        a composite scintillator attached to the support structure, the composite scintillator configured to convert radiation energy from the sample into light energy, wherein the composite scintillator comprises:
            a polymer;
            a fluorescing agent; and
            a selective ligand; and
        a photomultiplier tube (PMT) configured to receive the light energy and generate an electrical signal in response thereto.

2. The system of claim 1, wherein the selective ligand is selected to capture radionuclides that are without measurable gamma lines.

3. The system of claim 2, wherein the radionuclides that are without measurable gamma lines include at least one of $^{90}$Sr and $^{99}$Tc.

4. The system of claim 2, wherein the radionuclides that are without measurable gamma lines decay by pure beta particle emissions.

5. The system of claim 1, wherein the support structure is a housing and the composite scintillator is attached to an internal portion of the housing.

6. The system of claim 5, wherein the composite scintillator defines a fluid passageway within the internal portion of the housing, and wherein the housing comprises:
    an inlet configured to receive the sample into the fluid passageway; and
    an outlet configured to output the sample from the fluid passageway.

7. The system of claim 6, further comprising a pump coupled with the inlet of the housing, the pump configured to pump the sample through the fluid passageway.

8. The system of claim 1, further comprising at least one additional PMT.

9. The system of claim 8, wherein the PMT and the at least one additional PMT are coupled to a housing 180° apart relative to each other.

10. The system of claim 1, further comprising:
a transmitter configured to transmit the electrical signal from the PMT;
a transponder configured to receive the electrical signal from the transmitter; and
a receiver configured to receive the electrical signal from the transponder.

11. A device for collection of radionuclides, comprising:
a support structure configured to receive a fluid sample;
a mixture attached to an internal wall of the support structure, the mixture comprising:
a polymer;
a fluorescent organic scintillator; and
a chemical extractant.

12. The device of claim 11, wherein the support structure is configured as a member that encapsulates the mixture.

13. The device of claim 12, wherein the member is operably adapted for the fluid sample to flow within the member through a fluid passageway defined by the mixture.

14. The device of claim 13, further comprising a pump configured to pump the fluid sample to flow through the fluid passageway.

15. The device of claim 11, wherein the support structure includes a plurality of walls that define at least one well configured to hold the fluid sample, wherein the mixture is attached to at least a bottom portion of the well.

16. The device of claim 15, wherein the bottom portion of the well is transparent such that a photomultiplier tube receives light energy emitted through the bottom portion of the well.

17. The device of claim 11, wherein the polymer comprises at least one member of the group consisting of polyvinyltoluene, polymethylmethacrylate and polystyrene.

18. The device of claim 11, wherein the fluorescent organic scintillator comprises at least one member of the group consisting of anthracene and stilbene.

19. The device of claim 11, wherein the chemical extractant comprises a quaternary ammonium salt.

20. The device of claim 11, wherein the chemical extractant is adapted to concentrate radionuclides that are at least one of a pure beta emitter and a pure alpha emitter.

21. A method of detecting radionuclides, comprising:
collecting a sample from an environment; and
concentrating radionuclides from the sample within a composite scintillator attached to an internal wall of a device, the composite scintillator comprising a polymer, a fluorescent organic scintillator, and a chemical extractant.

22. The method of claim 21, wherein concentrating the radionuclides includes concentrating at least one of a pure beta emitter and a pure alpha emitter from the sample.

23. The method of claim 21, wherein collecting the sample includes collecting an aqueous sample from the environment.

24. The method of claim 21, further comprising containing the composite scintillator within the device including an internal fluid passageway defined by the composite scintillator.

25. The method of claim 23, further comprising pumping the aqueous sample through the internal fluid passageway.

26. The method of claim 23, further comprising passively flowing the aqueous sample through the internal fluid passageway.

27. The method of claim 21, further comprising:
generating an initial fluorescent signal through an interaction of the composite scintillator and the radionuclides within the sample; and
amplifying the initial fluorescent signal with at least one photomultiplier tube.

28. The method of claim 21, further comprising selecting the polymer to comprise at least one member of the group consisting of polyvinyltoluene, polymethylmethacrylate and polystyrene.

29. The method of claim 21, further comprising formulating the scintillator to comprise at least one member of the group consisting of anthracene and stilbene.

30. The method of claim 21, further comprising formulating the chemical extractant to comprise a quaternary ammonium salt.

* * * * *

UNITED STATES PATENT AND TRADEMARK OFFICE
CERTIFICATE OF CORRECTION

PATENT NO. : 7,923,692 B2  
APPLICATION NO. : 12/244876  
DATED : April 12, 2011  
INVENTOR(S) : Troy J. Tranter et al.

Page 1 of 1

It is certified that error appears in the above-identified patent and that said Letters Patent is hereby corrected as shown below:

In the specification:
COLUMN 5, LINE 45, change "photodiode" to --photodiode (not shown)--

Signed and Sealed this
Fourteenth Day of May, 2013

Teresa Stanek Rea
*Acting Director of the United States Patent and Trademark Office*